United States Patent [19]
Wyslouzil

[11] 3,962,403
[45] June 8, 1976

[54] PROCESS FOR SEPARATION OF NAHCOLITE FROM OIL SHALE

[75] Inventor: Dagobert M. Wyslouzil, Peterborough, Canada

[73] Assignee: The Superior Oil Company, Houston, Tex.

[22] Filed: Jan. 14, 1974

[21] Appl. No.: 433,122

[52] U.S. Cl. .................. 423/206 R; 23/302 T; 208/11 LE; 423/427
[51] Int. Cl.² .................. C01D 7/22; C10G 1/00
[58] Field of Search .......... 423/204, 206, 207, 427; 201/9, 20; 208/11; 209/111.5, 111.6; 23/302 N

[56] References Cited
UNITED STATES PATENTS

| | | | |
|---|---|---|---|
| 3,097,744 | 7/1963 | Hutter et al. | 209/111.6 |
| 3,133,010 | 5/1964 | Irish et al. | 208/11 |
| 3,479,133 | 11/1969 | Warzel | 423/206 T |
| 3,795,310 | 3/1974 | Buchot et al. | 209/111.5 |
| 3,819,805 | 6/1974 | Graves et al. | 423/206 |
| 3,821,353 | 6/1974 | Weichman | 423/206 T |

OTHER PUBLICATIONS

Dyni et al., Thermal Method for Quanitive Determination of Nahcolite in Colorado Oil Shale, U.S. Geol. Survey Prof. Paper, 750B, pp. B194–198, 1971.
Dyni; John R. et al., Chemical Abstracts, vol. 75, 1971, p. 448, abstract No. 104721a.

Primary Examiner—Oscar R. Vertiz
Assistant Examiner—Gary P. Straub
Attorney, Agent, or Firm—Arnold, White & Durkee

[57] ABSTRACT

Nahcolite-bearing oil shale ore is heated to produce a distinct color change in the nahcolite, differentiating the nahcolite from the host oil shale for optical sorting, and such sorting is then accomplished by optical sorting means.

11 Claims, No Drawings

PROCESS FOR SEPARATION OF NAHCOLITE FROM OIL SHALE

BACKGROUND OF THE INVENTION

The present invention relates to the separation of minerals from ore, and, more particularly, to the separation of nahcolite from mined oil shale ore.

Large deposits of oil-bearing shale have been discovered in this country, but have remained relatively untapped for want of an economic process for recovery of the oil at a cost comparable to conventional oil sources. Some of these oil shale deposits also contain substantial quantities of other valuable minerals. Recovery of such minerals from oil shale deposits will help to make the recovery of the oil more economical.

One of the minerals found in substantial quantities in oil shale deposits is nahcolite, a naturally occurring sodium bicarbonate, which may be used as is or converted to sodium carbonate. If this nahcolite can be efficiently separated from the mined ore, prospects for profitable recovery of oil and other minerals from such deposits will be substantially enhanced.

Because of its limited availability, nahcolite has received little industrial interest. However, its effectiveness as a scrubbing agent for removal of oxides of sulfur, nitrogen, and other elements from flue gas and the like is expected to generate a substantial market when it can be made available in large quantities and at a low or moderate cost.

As used herein, the terms "ore" and "oil shale ore" refer to nahcolite-bearing oil shale, and "oil shale" refers to the residue which remains after the nahcolite has been removed from the ore.

"Nahcolite" is used herein to refer to the naturally occurring sodium bicarbonate. "Converted nahcolite" refers to nahcolite having at least a surface layer of sodium carbonate produced by heating the nahcolite. "Decomposed nahcolite" refers to nahcolite which has been substantially decomposed to sodium carbonate by heating, but which may have a nahcolite core.

SUMMARY OF THE INVENTION

The present invention achieves the separation of nahcolite from mined oil shale ore by a process in which the ore is heated at a temperature and for a time suitable to produce a distinct color change in at least the surface of the nahcolite, so that the heated, or "converted," nahcolite can be optically distinguished from the remainder of the oil shale. The converted nahcolite then is separated from the remaining oil shale on the basis of this color difference.

In one application of the present invention, mined ore is crushed to a particle size of about ¾ inch for convenience in handling. The ore particles are then introduced into a heater having a temperature of about 200°C and are retained in the heater for about 15 minutes. Following the heating step, the ore particles are fed to a conventional optical sorting machine that has been programmed to separate the lighter-colored (converted nahcolite) particles from the darker oil shale particles.

DETAILED DESCRIPTION OF PREFERRED EMBODIMENTS

Nahcolite-bearing oil shale ore comes from the mine a dirty brown color. Although the nahcolite itself usually appears somewhat shinier than the remainder of the oil shale ore, it has the same basic color as the rest of the ore. The mined ore first is crushed to produce particles or fragments of less than about 1 inch in size, preferably between about ½ inch and about ¾ inch in size, by conventional crushing apparatus such as a jaw crusher.

The crushed or otherwise sized ore is heated to convert the surface of the nahcolite in the ore to sodium carbonate according to the formula: $2NaHCO_3 + Heat \rightarrow Na_2CO_3 + CO_2 + H_2O$. The time required to effect this surface conversion varies, of course, with the temperature to which the particles are exposed. A group of oil shale ore samples having a particle size distribution of:

| Size | Percent of Sample |
|---|---|
| −¾ inch + ½ inch | 40 |
| −½ inch + ¼ inch | 35 |
| −¼ inch | 25 |
| | 100 | were heated at the temperatures and for the times shown below to convert at least the surface of the nahcolite to sodium carbonate for optical sorting:

| Temperature, °C | Required Heating Time |
|---|---|
| 100 | 2–3 hours |
| 150 | 30 minutes |
| 200 | 15 minutes |
| 700 | 20–30 seconds |
| 1000 | 5–10 seconds |

Heating at the higher temperatures, 700° and 1000°C, is not as desirable as heating at the lower temperatures because close control of the exposure time is critical to minimize distillation and pyrolysis of the oil. In addition, increasing exposure time at the higher temperatures tends to reduce the resistance of the converted nahcolite to flaking and crumbling. The corners and edges of the oil shale fragments are particularly sensitive to pyrolysis at these high temperatures. On the other hand, surface conversion is quite uniform at 200°C, and is achieved in a reasonable time.

When nahcolite is freshly converted to sodium carbonate, it has a glossy, blue-white luster which changes to a chalky white after the converted particle has been standing in the air for some time. This change is thought to be caused by hydration, and it further enhances the contrast between the converted nahcolite and the remaining oil shale. Furthermore, the oil shale tends to darken somewhat during the heating step, making the contrast even more distinct.

Following the heating (converting) step, the fragments of ore are passed through an optical sorter such as, for example, that disclosed in U.S. Pat. No. 3,066,797 to Fraenkel entitled "Colour Sorting Machines," in which the lighter colored converted nahcolite is separated from the remaining oil shale by a jet of air or other ejector means.

In one test, an ore sample having the size distribution described above was heated at approximately 150°C for one hour to convert the surface of the nahcolite to sodium carbonate. The resulting converted nahcolite product was then separated from the remaining oil shale by a Sortex model 962M optical sorting machine (manufactured by Gunson's Sortex Limited, London, England). Of the −¾ inch + ½ inch fraction of the test sample, approximately 70 percent was separated as a dark fraction and approximately 30 percent as a light fraction. Each fraction was immersed in city water for 48 hours and occasionally agitated to dissolve both the sodium carbonate and sodium bicarbonate constituents of the respective samples. Of the dark fraction, less than 7 percent was soluble, while more than 26 percent of the light fraction was soluble under the same conditions. Of the —½ inch + ¼ inch fraction, less than 4 percent of the dark fraction and more than 28 percent of the light fraction was soluble under the same conditions.

Nahcolite can be conveniently converted for optical sorting at temperatures in the neighborhood of about 150°–200°C. In this temperature range, surface conversion occurs uniformly and the time required for such conversion is neither excessively long nor so short that time control becomes critical. In addition, little or no oil is lost at this temperature, and the converted nahcolite is fairly competent. Processing of ore particles having sizes of from about ¼ inch to about ¾ inch is quite effective under these conditions.

In applications where shorter residence time in the heater is desirable, the temperature may be raised accordingly. Controlling residence time may be important in order to achieve satisfactory surface conversion with minimum loss of oil or detrimental effect on the subsequent recovery of other valuable minerals, such as alumina, from the ore.

It will be appreciated that optical sorting of nahcolite from oil shale ore according to the present invention requires only that some portion of the exposed surface of the nahcolite-bearing particles be converted to the lighter-colored sodium carbonate. Accordingly, heating times and temperatures may be selected to provide conversion of less than all of the nahcolite surface to sodium carbonate. Under such conditions, the lighter-colored fraction obtained upon optical sorting may contain a substantial amount of unconverted nahcolite, which may be recovered as the bicarbonate.

Should a predominately sodium carbonate product be desired, heating may be continued for a longer time to substantially decompose the nahcolite to the carbonate. In addition, the light-colored output from the optical sorter may be subjected to an appropriate water leach, and sodium carbonate recovered from the filtered or otherwise clarified leach liquor by evaporation of the water.

Several stages of optical sorting may be utilized to separate nahcolite from oil shale in accordance with the present invention. It should also be noted that area sorting may be employed, wherein the percentage of the area of a particle which is white may be used as the sorting criterion, and varied for each successive stage. In this manner, fractions which are substantially all light-colored and all dark-colored may be segregated from intermediate fractions. By this means concentrated sodium carbonate and/or sodium carbonate fractions may be separated from the remaining oil shale without the necessity for dissolution and leaching.

Accordingly, the present invention provides a method for separation of nahcolite from oil shale. It will be readily appreciated that ore fragments of various sizes may be processed in accordance herewith by making corresponding modifications in the times and temperatures utilized to produce the desired results, and it is to be understood that such modifications may be made in the carrying out of the objects of this invention within the scope of the appended claims.

What is claimed is:

1. A process for separation of nahcolite from nahcolite-bearing oil shale ore, comprising the steps of:
   heating said nahcolite-bearing oil shale ore at a temperature of from about 100°C to about 1000°C for a time sufficient to convert at least some of the surface of said nahcolite to a lighter-colored product; and
   optically sorting to separate said lighter-colored product from the remaining oil shale.

2. The process of claim 1 wherein said nahcolite-bearing oil shale ore is in the form of particles of from about ¼ inch to about ¾ inch in size and said heating is at a temperature of from about 150°C to about 200°C.

3. The process of claim 2 wherein said heating is for a time of from about 15 minutes to about 30 minutes.

4. The process of claim 1 wherein said optical sorting includes at least two stages of sorting.

5. The process of claim 1 wherein said optical sorting comprises area sorting.

6. The process of claim 1 wherein substantially all of said nahcolite is converted to said lighter-colored product.

7. A process for separation of nahcolite from nahcolite-bearing oil shale ore, comprising the steps of:
   heating said nahcolite-bearing oil shale ore at a temperature of from about 100°C to about 1000°C for a time sufficient to convert at least some of the surface of said nahcolite to sodium carbonate having a distinctly lighter color than the surface of the remaining oil shale; and
   optically sorting said heated nahcolite-bearing oil shale ore to separate a lighter-colored converted nahcolite fraction from the remaining oil shale.

8. The process of claim 7 wherein said nahcolite-bearing oil shale ore is in the form of particles of from about ¼ inch to about ¾ inch in size and said heating is at a temperature of from about 150°C to about 200°C.

9. The process of claim 8 wherein said heating is for a time of from about 15 minutes to about 30 minutes and substantially all of the surface of said nahcolite is converted to sodium carbonate.

10. The process of claim 7 wherein said optical sorting comprises a plurality of area sorting stages.

11. The process of claim 7 wherein said heating is for a time sufficient to convert substantially all of said nahcolite to sodium carbonate.

* * * * *